No. 882,882. PATENTED MAR. 24, 1908.
J. G. HENZEL.
FISH HOOK.
APPLICATION FILED MAY 27, 1907.
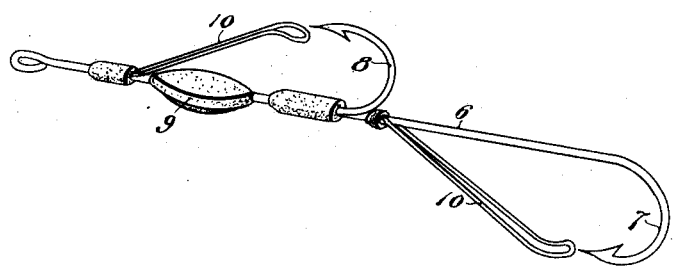

UNITED STATES PATENT OFFICE.

JOHN G. HENZEL, OF CHICAGO, ILLINOIS.

FISH-HOOK.

No. 882,882.

Specification of Letters Patent.

Patented March 24, 1908.

Application filed May 27, 1907. Serial No. 375,886.

*To all whom it may concern:*

Be it known that I, JOHN G. HENZEL, citizen of the United States, residing at Chicago, in the county of Cook and State of Illinois, have invented certain new and useful Improvements in Fish-Hooks, of which the following is a specification.

This invention relates to fish hooks, and comprises a novel form of hook adapted for use in connection with either natural or artificial baits, and consists of a double or tandem hook on a single shank, one hook, at the front, being presented upwardly, and the other hook, at the rear, for "short biters", being presented downwardly, the hooks being also provided with weed guards.

The invention is illustrated in the accompanying drawing which is a perspective view of the hook.

Referring specifically to the drawing, 6 indicates a long shank having a rear hook 7 and a front hook 8, the former of which is presented downwardly and the latter of which is presented upwardly, or, in other words, the hooks are presented oppositely with respect to the shank.

The shank is weighted near the front end with a piece of lead 9 shaped to keep the hook right side up and in proper position. The bait is attached to the front hook and extends back over the rear hook, the piece of lead 9 and the other parts being formed so that the hooks will ride right side up with the point of the front hook up and the rear hook pointing down, and when a fish strikes short or at the rear end of the bait he will get the rear hook through his lower lip, the front hook being adapted to engage the upper lip when the whole bait is taken.

Each hook is provided with a weed guard 10 consisting of a looped wire soldered or otherwise secured to the shank and projecting outwardly in front of the point of the hook. It will be noticed that the guard just clears the point of the hook so that it has free movement either inwardly or laterally and will not interfere with hooking a fish should he strike from the side of the hook.

The shape of the piece of lead 9 necessary to cause the hooks to ride right side up as stated is flattened on top, with an excess of weight below the shank, whereby the pressure of the water as the hook is drawn through the same will cause the hook to ride in the manner stated.

I claim:

A hook consisting of a single shank provided with a front hook projecting in one direction and a rear hook projecting in the opposite direction, and a piece on the shank flattened on top and with an excess of weight below the shank to cause the hooks to ride with the front hook up and the rear hook down, when drawn through the water.

In testimony whereof I affix my signature, in presence of two witnesses.

JOHN G. HENZEL.

Witnesses:
NELLIE FELTSKOG,
H. G. BATCHELOR.